United States Patent
Lee

(10) Patent No.: US 8,495,461 B2
(45) Date of Patent: Jul. 23, 2013

(54) DATA MODULATION METHOD, MODULATOR, RECORDING METHOD, AND RECORDING APPARATUS

(75) Inventor: Jun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 439 days.

(21) Appl. No.: 12/678,682

(22) PCT Filed: Sep. 11, 2008

(86) PCT No.: PCT/KR2008/005386
§ 371 (c)(1),
(2), (4) Date: Oct. 18, 2010

(87) PCT Pub. No.: WO2009/038311
PCT Pub. Date: Mar. 26, 2009

(65) Prior Publication Data
US 2011/0055665 A1     Mar. 3, 2011

(30) Foreign Application Priority Data
Sep. 17, 2007 (KR) ......................... 10-2007-0094091
Sep. 21, 2007 (KR) ......................... 10-2007-0096497

(51) Int. Cl.
*H03M 13/00*     (2006.01)
(52) U.S. Cl.
USPC ........................................................ 714/759
(58) Field of Classification Search
USPC ................. 714/704, 759, 773–774, 771, 776, 714/778–780, 800; 341/58–59
See application file for complete search history.

(56) References Cited

U.S. PATENT DOCUMENTS

| | | | |
|---|---|---|---|
| 5,373,513 A * | 12/1994 | Howe et al. | .................... 714/775 |
| 5,574,448 A | 11/1996 | Weng et al. | |
| 5,969,649 A | 10/1999 | Ashley et al. | |
| 6,018,304 A * | 1/2000 | Bessios | ............................ 341/58 |
| 6,697,311 B1 | 2/2004 | Kim | |
| 2002/0159367 A1 | 10/2002 | Ahn | |
| 2006/0164263 A1 | 7/2006 | Park et al. | |

FOREIGN PATENT DOCUMENTS

| | | |
|---|---|---|
| CN | 1819047 A | 8/2006 |
| JP | 2006-209954 A | 8/2006 |

OTHER PUBLICATIONS

Nakagawa et al., A simple detection method for RLL codes, Sep. 1997, IEEE Trans on Magnetics, vol. 33, No. 5, p. 3262-3264.*
Hu et al., Improved Runlength control when using Low density parity check codes, 2006, iEEE, p. 1-5.*
Immink, Error detectiong Runlength limited sequences, 1990, IEEE video, audio & data recording, p. 176-182.*
Coene et al., Run length limited parity check coding for transition shift errors in optical recording, 2001, IEEE, p. 2982-2986.*

* cited by examiner

*Primary Examiner* — Shelly A Chase
(74) *Attorney, Agent, or Firm* — Birch, Stewart, Kolasch & Birch, LLP

(57) ABSTRACT

A data modulation method and a data error correction method are provided. The data modulation method includes generating a channel sequence for an input sequence, determining whether or not the channel sequence violates a Run Length Limit (RLL) constraint, and performing, when the channel sequence violates the RLL constraint, bit flip at a position prior to a position at which the RLL constraint is violated among positions of bits included in the channel sequence. The data error correction method includes detecting an error bit of received data using a parity check matrix, determining whether or not the error bit is an error caused by bit flip, and correcting the error bit when the error bit is an error caused by bit flip for applying an RLL constraint.

38 Claims, 8 Drawing Sheets

Fig. 1
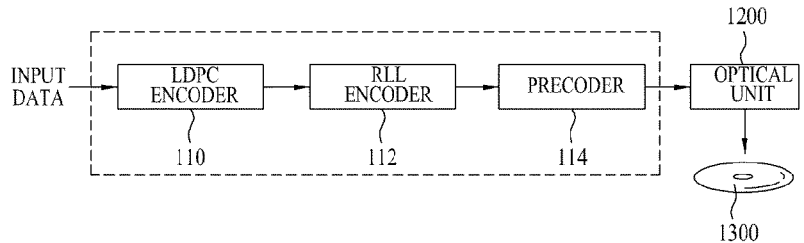
Fig. 2
|    | S1  |    | S2  |    | S3  |    | S4  |    | S5  |    |
|----|-----|----|-----|----|-----|----|-----|----|-----|----|
| 00 | 000 | S3 | 001 | S1 | 010 | S3 | 100 | S3 | 100 | S1 |
| 01 | 000 | S4 | 001 | S2 | 010 | S4 | 100 | S4 | 100 | S2 |
| 10 | 000 | S5 | 001 | S3 | 010 | S1 | 010 | S5 | 101 | S1 |
| 11 | 000 | S2 | 000 | S5 | 010 | S2 | 100 | S5 | 101 | S2 |
Fig. 3
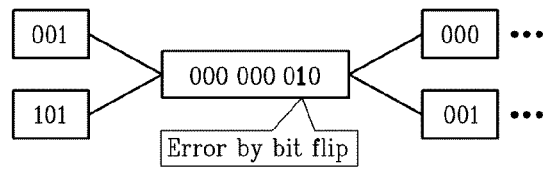
Fig. 4
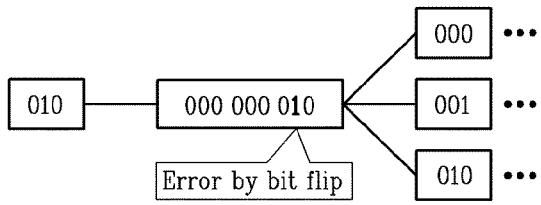
Fig. 5
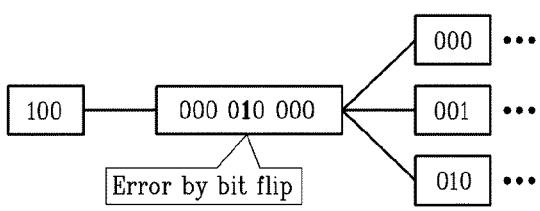
Fig. 6
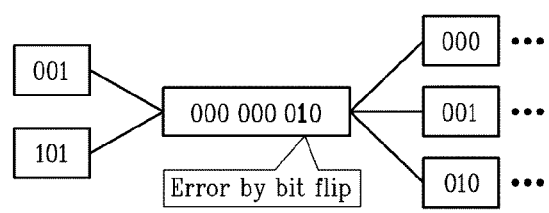

Fig. 13
|    | S1  |    | S2  |    | S3  |    | S4  |    | S5  |    |
|----|-----|----|-----|----|-----|----|-----|----|-----|----|
| 00 | 000 | S3 | 001 | S1 | 010 | S3 | 100 | S3 | 100 | S1 |
| 01 | 000 | S4 | 001 | S2 | 010 | S4 | 100 | S4 | 100 | S2 |
| 10 | 000 | S5 | 001 | S3 | 010 | S1 | 010 | S5 | 101 | S1 |
| 11 | 000 | S2 | 000 | S5 | 010 | S2 | 100 | S5 | 101 | S2 |
Fig. 14
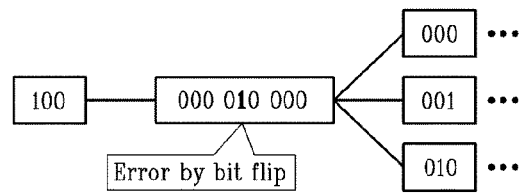
Fig. 15
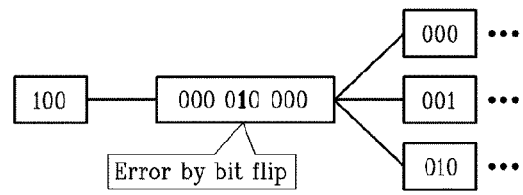
Fig. 16
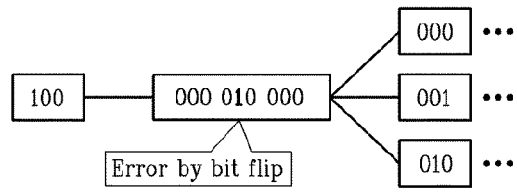
Fig. 17
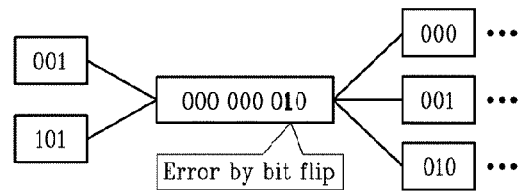
Fig. 18
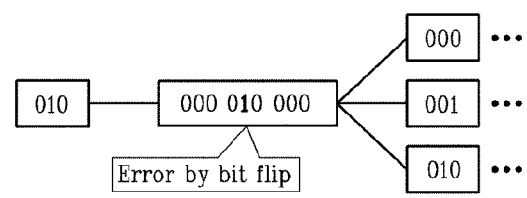

Fig. 25
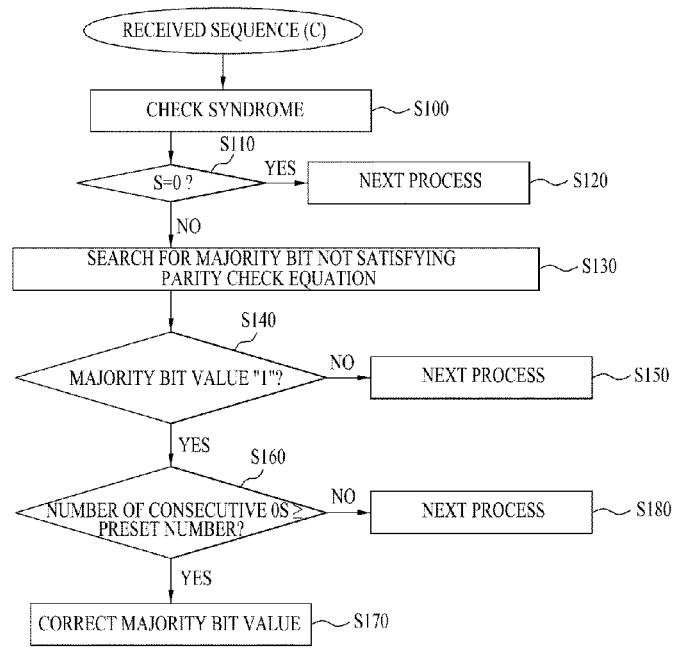
Fig. 26
Received sequence(C)=($c_1, c_2 \ldots c_{10}$)    Syndrome(S)=$C \times H^T$
Parity Check Equation    Parity Check Matrix (H)
$c_1 + c_4 + c_8 = 0$
$c_2 + c_5 + c_9 = 0$
$c_3 + c_6 + c_{10} = 0$
$c_1 + c_5 + c_{10} = 0$
$c_2 + c_7 + c_8 = 0$
$c_3 + c_4 + c_9 = 0$
$$H = \begin{bmatrix} 1 & 0 & 0 & 1 & 0 & 0 & 0 & 1 & 0 & 0 \\ 0 & 1 & 0 & 0 & 1 & 0 & 0 & 0 & 1 & 0 \\ 0 & 0 & 1 & 0 & 0 & 1 & 0 & 0 & 0 & 1 \\ 1 & 0 & 0 & 0 & 1 & 0 & 0 & 0 & 0 & 1 \\ 0 & 1 & 0 & 0 & 0 & 0 & 1 & 1 & 0 & 0 \\ 0 & 0 & 1 & 1 & 0 & 0 & 0 & 0 & 1 & 0 \end{bmatrix}$$
Fig. 27
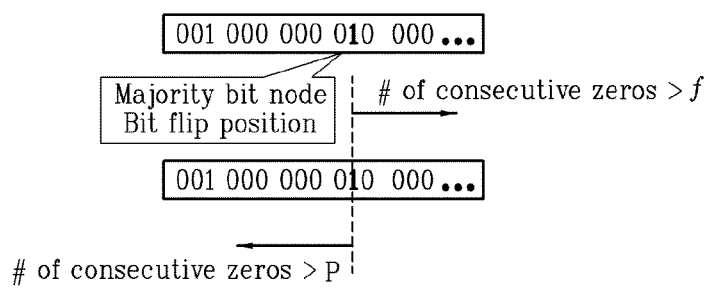
P & $f$ values : Depending on d, k & r constraints

DATA MODULATION METHOD, MODULATOR, RECORDING METHOD, AND RECORDING APPARATUS

TECHNICAL FIELD

The present invention relates to a data modulation method, a modulator, a recording method, and a recording apparatus, and more particularly, to a method and apparatus for modulating data to be recorded on an optical recording medium and a recording method and apparatus using the same.

The present invention also relates to a data error correction method and apparatus, and more particularly, to a method and apparatus for correcting an error in modulated data to be recorded on an optical recording medium.

BACKGROUND ART

A reproduction unit in a general recording system uses a modulation code to reduce distortion of a reproduced signal caused by interference between adjacent symbols and to achieve appropriate timing recovery.

The modulation code can be represented by (d, k), which is referred to as a Run Length Limit (RLL) code. Here, "d" indicates the minimum number of 0s that can be present between 1s of the modulation code and is used as a constraint to reduce distortion of a signal caused by interference between adjacent symbols. "k" indicates the maximum number of 0s that can be present between 1s and is used as a constraint to achieve timing recovery.

Methods for applying the k constraint to a modulation code when the modulation code is designed include a bit flip method in which a channel sequence output from a modulation code encoder is monitored and, when a sequence violating the k constraint is detected at a position of the sequence, data of "0" is changed to "1" at the position to apply the k constraint.

That is, the bit flip method adds an error to the channel sequence to apply the k constraint to the channel sequence. In this method, an error is added to the channel sequence before it is recorded on a recording medium. Therefore, the sequence to be recorded on the recording medium contains an error.

Thus, the bit flip method has problems in that it is difficult to reconstruct original data during demodulation if bit flip frequently occurs and there are limits to improving recording density even if the original data can be reconstructed. Especially, for modulation codes for recording systems, these problems are more serious since an error in one bit causes errors in a number of other bits during decoding due to the design characteristics of the modulation codes for recording systems.

DISCLOSURE OF INVENTION

Technical Problem

An object of the present invention devised to solve the problem lies on providing a data modulation method, a modulator, a recording method, and a recording apparatus which facilitate reconstruction of original data and can improve recording density.

Another object of the present invention devised to solve the problem lies on providing a modulation method and a data error correction method and a data error correction apparatus which efficiently correct errors occurring in the modulation method.

Technical Solution

The object of the present invention can be achieved by providing a data modulation method including generating a channel sequence for an input sequence, determining whether or not the channel sequence violates a Run Length Limit (RLL) constraint, and performing, when the channel sequence violates the RLL constraint, bit flip at a position prior to a position at which the RLL constraint is violated among positions of bits included in the channel sequence.

The performing the bit flip may include determining the bit flip position so that error transfer does not occur during decoding.

The determining the bit flip position may include determining the bit flip position based on both the RLL constraint violation position and a codeword length.

The determining the bit flip position may include determining the bit flip position based on a remainder of division of the violation position by the codeword length.

The RLL constraint may be a constraint regarding the maximum number of 0s present between 1s in the channel sequence and the bit flip may be performed by converting a bit of "0" to a bit of "1" at a specific position.

The data modulation method may further include setting the RLL constraint based on statistical check of the number of bit flips.

The generating the channel sequence for the input sequence may include generating the channel sequence for the input sequence using a modulation table.

The modulation table may include at least one state, a codeword corresponding to an input code, and a next state.

The modulation table may generate a channel sequence in which a minimum number of 0s between 1s is 1, a maximum number of 1s between 0s is an infinite number, and a Repeated Minimum Transition Run (RMTR) constraint is 2.

In another aspect of the present invention, provided herein is a data modulator including an encoder for generating a channel sequence for an input sequence, and a bit flipper for determining whether or not the channel sequence violates an RLL constraint and performing, when the channel sequence violates the RLL constraint, bit flip at a position prior to a position at which the RLL constraint is violated among positions of bits included in the channel sequence.

The bit flipper may determine the bit flip position so that error transfer does not occur during decoding.

The bit flipper may determine the bit flip position based on both the position at which the RLL constraint is violated and a codeword length.

The bit flipper may determine the bit flip position based on a remainder of division of the violation position by the codeword length.

The RLL constraint may be a constraint regarding the maximum number of 0s present between 1s in the channel sequence and the bit flipper may convert a bit of "0" to a bit of "1" at a specific position.

The encoder may set the RLL constraint based on statistical check of the number of bit flips.

The encoder may generate the channel sequence for the input sequence using a modulation table.

The modulation table may include at least one state, a codeword corresponding to an input code, and a next state.

The modulation table may generate a channel sequence in which a minimum number of 0s between 1s is 1, a maximum number of 1s between 0s is an infinite number, and a Repeated Minimum Transition Run (RMTR) constraint is 2.

In another aspect of the present invention, provided herein is a data modulation method including generating a channel sequence for an input sequence, determining whether or not the channel sequence violates an RLL constraint, performing, when the channel sequence violates the RLL constraint, bit flip at a position prior to a position at which the RLL constraint is violated among positions of bits included in the channel sequence to generate modulation data, and storing the modulation data on a recording medium.

In another aspect of the present invention, provided herein is a data recording apparatus including a modulation unit for modulating data to generate modulation data, and an optical unit for emitting light to a recording medium to record the modulation data on the recording medium.

The present invention has advantages in that it does not require an auxiliary table for applying the k constraint and can easily make a change in the k constraint and can also prevent error transfer due to bit flip.

In another aspect of the present invention, provided herein is a data error correction method including detecting an error bit of received data using a parity check matrix, determining whether or not the error bit is an error caused by bit flip, and correcting the error bit when the error bit is an error caused by bit flip for applying an RLL constraint.

The determining whether or not the error bit is an error caused by bit flip may include checking a value of the error bit and determining whether or not an RLL constraint of the received data is present if the value of the error bit is 1.

The determining whether or not an RLL constraint of the received data is present may include checking the respective numbers of consecutive 0 bits prior to and subsequent to the error bit.

The number of consecutive 0 bits may be determined based on a Repeated Minimum Transition Run (RMTR) constraint and an RLL constraint applied to the received data.

The determining whether or not the error bit is an error caused by bit flip further may include checking a frequency of detection of the error bit.

An error bit detected with highest frequency may be determined to be an error caused by bit flip.

The correcting the error bit may include correcting the error bit from 1 to 0.

The correcting the error bit may include converting a sign of a probability value of the error bit.

The detecting the error bit of the received data may include calculating a syndrome vector from the parity check matrix and determining whether or not an error has occurred in the received data.

In another aspect of the present invention, provided herein is a data error correction apparatus including an error detection unit for detecting an error bit of received data using a parity check matrix, an error determination unit for determining whether or not the error bit is an error caused by bit flip, and an error correction unit for correcting the error bit when the error bit is an error caused by bit flip for applying an RLL constraint.

The error determination unit may check a value of the error bit and determine whether or not an RLL constraint of the received data is present if the value of the error bit is 1.

The error determination unit may check the respective numbers of consecutive 0 bits prior to and subsequent to the error bit to determine whether or not an RLL constraint of the received data is present.

The number of consecutive 0 bits may be determined based on an RMTR constraint and an RLL constraint applied to the received data.

The error determination unit may check a frequency of detection of the error bit.

The error determination unit may determine that an error bit detected with highest frequency is an error caused by bit flip.

The error correction unit may correct the error bit from 1 to 0.

The error correction unit may convert a sign of a probability value of the error bit.

The error detection unit may calculate a syndrome vector from the parity check matrix and determine whether or not an error has occurred in the received data.

Advantageous Effects

The present invention has advantages in that it does not require an auxiliary table for applying the k constraint and can easily make a change in the k constraint and can also prevent error transfer due to bit flip.

The present invention also has advantages in that it efficiently correct errors occurring during a procedure in which a k constraint is applied to a modulation code through bit flip after the modulation code is encoded.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 1 is a block diagram of a data recording apparatus according to an embodiment of the present invention.

FIG. 2 illustrates an example modulation table for generating a channel sequence in a data modulation method according to an embodiment of the present invention.

FIGS. 3 to 5 schematically illustrate a method for performing bit flip when k is 10.

FIGS. 6 to 8 schematically illustrate a method for performing bit flip when k is 9 in the embodiment of the present invention.

FIG. 13 illustrates an example modulation table for generating a channel sequence in a data modulation method according to an embodiment of the present invention.

FIGS. 14 to 16 schematically illustrate a method for performing bit flip when k is 10.

FIGS. 17 to 19 schematically illustrate a method for performing bit flip when k is 9 in the embodiment of the present invention.

FIG. 25 is a flow chart illustrating a data error correction method according to an embodiment of the present invention.

FIG. 26 illustrates an example parity check matrix and an example syndrome vector.

FIG. 27 schematically illustrates the error correction method of FIG. 13.

BEST MODE FOR CARRYING OUT THE INVENTION

Figure 7:
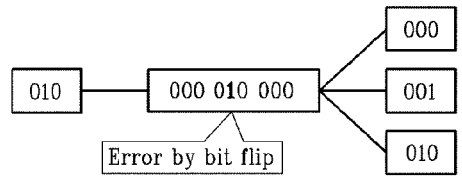

Now, exemplary embodiments of the present invention will be described in detail with reference to the accompanying drawings so that the above and other aspects of the present invention will be easily carried out by those skilled in the art. The term "recording apparatus" used in the present invention refers to any apparatus which can write or read data to or from a recording medium. The term "recording medium" used in the present invention refers to any medium on which data has been or can be recorded. A specific example of the recording medium is an optical disc.

FIG. 1 is a block diagram of a data recording apparatus according to an exemplary embodiment of the present invention. The data recording apparatus according to the embodiment of the present invention will now be described with reference to FIG. 1. As shown, the recording apparatus according to the embodiment of the present invention includes a modulation unit 1100 and an optical unit 1200.

The modulation unit 1100 modulates input data to generate modulation data and the optical unit 1200 records the modulation data generated by the modulation unit 1100 on a recording medium 1300. The optical unit 1200 may include an optical pickup.

As shown in FIG. 1, the modulation unit 1100 includes an encoder 110, a bit flipper 112, and a precoder 114.

FIG. 2 illustrates an example modulation table that can be used at the encoder 110. The modulation table of FIG. 2 contains a parity complementary code having a constraint of (1, ' ', 2). That is, a channel sequence generated by the modulation table may include at least one "0" between 1s and may include an infinite number of 0s. In addition, a Repeated Minimum Transition Run (RMTR) constraint is 2. The modulation table includes at least one register and each register contains a codeword corresponding to an input code and information specifying a next register.

When the channel sequence generated by the encoder 110 violates the Run Length Limit (RLL) constraint, the bit flipper 112 performs bit flip at a position prior to a position at which the RLL constraint is violated among the positions of bits included in the channel sequence to apply the RLL constraint. A detailed description of this process will be described later.

The precoder 114 converts data generated through both the encoder 110 and the bit flipper 112 into a Non Return to Zero Invert (NRZI) signal and transfers the NRZI signal to the optical unit 1200. The optical unit 1200 records the modulated data on the recording medium using the optical pickup.

Reference will now be made in detail to a data modulation method according to an embodiment of the present invention. First, a channel sequence corresponding to input bits is generated using the modulation table illustrated in FIG. 2. As described above, the modulation table of FIG. 2 generates a (1, ' ', 2) parity complementary code.

FIG. 2 illustrates a modulation table used when the code rate is ⅔, i.e., used to generate a 3-bit codeword for a 2-bit input code. FIG. 2 also illustrates a modulation method when the modulation table includes 5 registers, each of which is divided into 5 states. However, the present invention is not limited to this modulation method and may be applied to a method that uses a different type of modulation table.

As shown in FIG. 2, a codeword corresponding to an initial input code is output at an initial state set in the modulation table and movement is then made to a next state set in the modulation table so as to sequentially generate codewords for subsequent input codes.

For example, when it is assumed that encoding of modulation codes starts at the state S1 and an input sequence to the modulation code encoder is [10 10 10], a channel code for the initial input code [10] is [000] and the next state is S1 according to the modulation table of FIG. 2. Accordingly, a channel code for the next input code [10] is also [000]. A channel sequence generated in this procedure is [000, 000, 000].

On the other hand, to achieve appropriate timing recovery of the system, it is necessary to apply a k constraint (i.e., the constraint of the maximum number of 0s present between 1s) to the channel sequence generated in the above manner.

In this embodiment, the k-condition is applied using the bit flip method. Here, it is necessary to select a bit flip position so as not to violate other constraints of the designed modulation code in the procedure for applying the k constraint.

Bit flip is a method for applying an error to the generated channel sequence before the data is recorded on the recording medium. Accordingly, the sequence recorded on the recording medium contains errors. In the modulation method according to the embodiment of the present invention, the number of errors is equal to the number of flipped bits.

Errors created by bit flip are corrected by an error correction algorithm in a decoding unit. An increase in the number of bit flips causes an increase in the amount of additional information of the error correction algorithm, thereby reducing decoding efficiency. Thus, it is necessary to keep the number of bit flips below an appropriate upper limit.

In this case, the k constraint is determined based on the fact that the number of bit flips increases as the value of "k" decreases. The k constraint can be set based on statistical check of the number of bit flips. It is preferable that the value k be determined so that the number of bit flips (i.e., the number of applied errors) is within the correction capabilities of the error correction code. The value k may also be determined according to presence or absence of a bit flip position that prevents the occurrence of error transfer during decoding.

For example, the value k for the channel sequence can be set to 7-10. Bit flip methods in the cases where the value k is 10, 9, and 7 are described below with reference to FIGS. 3 to 11.

First, a bit flip method in the case where the value k is 10 is described below with reference to FIGS. 3 to 5. The channel sequence generated using the modulation table may violate a k constraint of "10" according to relations with a sequence prior to the channel sequence and a sequence subsequent thereto. The k constraint "10" is applied to the generated channel sequence by performing bit flip on the channel sequence.

FIGS. 3 to 5 illustrate an example wherein bit flip is performed when k is 10. When the value k is set to 10, a bit flip position is determined. Here, a bit flip position for applying the k constraint to the channel sequence can be selected so as not to cause error transfer during decoding.

To prevent error transfer during decoding, the bit flip position can be determined based on both a position at which the k constraint is violated and the length of a codeword. More specifically, the bit flip position may be determined by a remainder after the violation position is divided by the codeword length.

For example, the bit flip position is 4 bits before the violation position when the remainder of the division of the violation position by the codeword length is 0, is 2 bits before the violation position when the remainder is 1, and is 3 bits before the violation position when the remainder is 2.

In the case of FIG. 3, the violation position of the k constraint "10" is a 14th bit position. The length of a codeword based on the modulation table is 3. Here, the bit flip position is an 11th bit position that is 3 bits before the 14th bit position which is the violation position since the remainder of the division of the violation position by the codeword length is 2. Through this bit flip, the channel sequence becomes a sequence to which the k constraint "10" has been applied. In this case, the d constraint requiring that at least one "0" be present between 1s (i.e., d=1) and the r constraint (i.e., r=2) are satisfied without causing error transfer during decoding.

In the case of FIG. 4, the violation position of the k constraint "10" is a 13th bit position. Thus, the bit flip position is the 11th bit position that is 2 bits before the 13th bit position which is the violation position since the remainder of the division of the violation position by the codeword length is 1. Through this bit flip, the channel sequence becomes a sequence to which the k constraint "10" has been applied. In this case, the bit flip allows satisfaction of the d and r constraints (i.e., d=1, r=2) without causing error transfer during decoding.

In the case of FIG. 5, the violation position of the k constraint "10" is a 12th bit position. Thus, the bit flip position is the 8th bit position that is 4 bits before the 12th bit position which is the violation position since the remainder of the division of the violation position by the codeword length is 0. Through this bit flip, the channel sequence becomes a sequence to which the k constraint "10" has been applied. In this case, the bit flip allows satisfaction of the d and r constraints (i.e., d=1, r=2) without causing error transfer during decoding.

Reference will now be made to a bit flip method when the value k is 9. The channel sequence generated using the modulation table violates a k constraint of "9" according to relations with a sequence prior to the channel sequence and a sequence subsequent thereto. The bit flipper 112 applies the k constraint "9" to the generated channel sequence by performing bit flip on the channel sequence.

Figure 8:
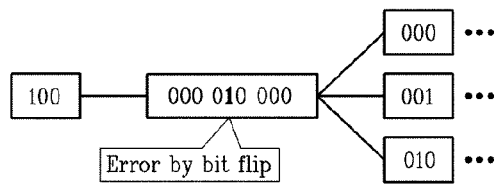

FIGS. 6 to 8 illustrate an example wherein bit flip is performed when k is 9. A method for performing bit flip is described below in detail with reference to FIGS. 6 to 8. As described above, a bit flip position for applying the k constraint to the channel sequence is selected so as not to cause error transfer during decoding.

First, a specific bit flip position which does not cause error transfer during decoding is selected to apply the constraint of k=9 to the channel sequence. To prevent error transfer during decoding, the bit flip position can be determined based on both a position at which the k constraint is violated and the length of a codeword.

In the case of FIG. 6, the violation position of the k constraint "9" is the 13th bit position. The length of a codeword according to the modulation table is 3. Here, the bit flip position is determined by a remainder after the violation position is divided by the codeword length.

For example, the bit flip position is 4 bits before the violation position when the remainder of the division of the violation position by the codeword length is 0, is 2 bits before the violation position when the remainder is 1, and is 3 bits before the violation position when the remainder is 2.

In the case of FIG. 6, the bit flip position is the 11th bit position that is 2 bits before the 13th bit position which is the violation position since the remainder is 1. Through this bit flip, the channel sequence becomes a sequence to which the k constraint "9" has been applied. In this case, the d and r constraints (i.e., d=1, r=2) are satisfied without causing error transfer during decoding.

In the case of FIG. 7, the violation position of the k constraint "9" is the 12th bit position. Thus, the bit flip position is the 8th bit position that is 4 bits before the 12th bit position which is the violation position since the remainder is 0. Through this bit flip, the channel sequence becomes a sequence to which the k constraint "9" has been applied. In this case, the bit flip allows satisfaction of the d and r constraints (i.e., d=1, r=2) without causing error transfer during decoding.

In the case of FIG. 8, the violation position of the k constraint "9" is the 11th bit position. Thus, the bit flip position is the 8th bit position that is 3 bits before the 11th bit position which is the violation position since the remainder is 2. Through this bit flip, the channel sequence becomes a sequence to which the k constraint "9" has been applied. In this case, the bit flip allows satisfaction of the d and r constraints (i.e., d=1, r=2) without causing error transfer during decoding.

Reference will now be made to a bit flip method when the value k is 7. The channel sequence generated using the modulation table violates a k constraint of "7" according to relations with a sequence prior to the channel sequence and a sequence subsequent thereto. The bit flipper 112 applies the k constraint "7" to the generated channel sequence by performing bit flip on the channel sequence.

Figure 9:
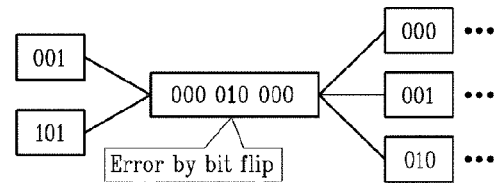
FIGS. 9 to 11 schematically illustrate a method for performing bit flip when k is 7 in the embodiment of the present invention.
Figure 10:
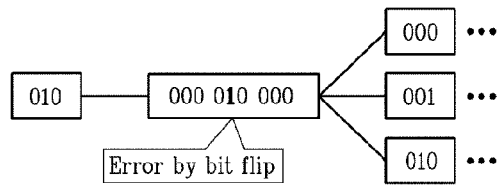
Figure 11:
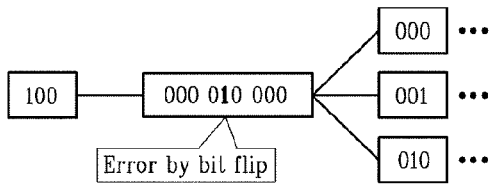

FIGS. 9 to 11 illustrate an example wherein bit flip is performed when k is 7. A method for performing bit flip is described below in detail with reference to FIGS. 9 to 11. As described above, a bit flip position for applying the k constraint to the channel sequence is selected so as not to cause error transfer during decoding.

First, a specific bit flip position which does not cause error transfer during decoding is selected to apply the constraint of k=7 to the channel sequence. To prevent error transfer during decoding, the bit flip position can be determined based on both a position at which the k constraint is violated and the length of a codeword.

In the case of FIG. 9, the violation position of the k constraint "7" is the 11th bit position. The length of a codeword according to the modulation table is 3. Here, the bit flip position is determined by a remainder after the violation position is divided by the codeword length.

For example, the bit flip position is 1 bit before the violation position when the remainder of the division of the violation position by the codeword length is 0, is 2 bits before the violation position when the remainder is 1, and is 3 bits before the violation position when the remainder is 2.

In the case of FIG. 9, the bit flip position is the 11th bit position that is 3 bits before the 11th bit position which is the violation position since the remainder is 2. Through this bit flip, the channel sequence becomes a sequence to which the k constraint "7" has been applied. In this case, the d and r constraints (i.e., d=1, r=2) are satisfied without causing error transfer during decoding.

In the case of FIG. 10, the violation position of the k constraint "7" is the 10th bit position. Thus, the bit flip position is the 8th bit position that is 2 bits before the 10th bit position which is the violation position since the remainder is 1. Through this bit flip, the channel sequence becomes a sequence to which the k constraint "7" has been applied. In this case, the bit flip allows satisfaction of the d and r constraints (i.e., d=1, r=2) without causing error transfer during decoding.

In the case of FIG. 11, the violation position of the k constraint "7" is the 9th bit position. Thus, the bit flip position is the 8th bit position that is 1 bit before the 9th bit position which is the violation position since the remainder is 0. Through this bit flip, the channel sequence becomes a sequence to which the k constraint "7" has been applied. In this case, the bit flip allows satisfaction of the d and r constraints (i.e., d=1, r=2) without causing error transfer during decoding.

In the above examples, it can be seen that the number of errors after decoding is equal to the number of bit flips even though the channel sequence has been converted by performing bit flip. Although a code generated by the modulation table includes many channel sequences violating the k constraint, each channel sequence can be converted into a channel sequence satisfying the k constraint, the d constraint, and an RMTR constraint according to the above method. In addition, the modulation method according to the embodiment of the present invention does not require an auxiliary table for applying the k constraint. Accordingly, the modulation method according to this embodiment can achieve excellent DC suppression performance.

Figure 12:
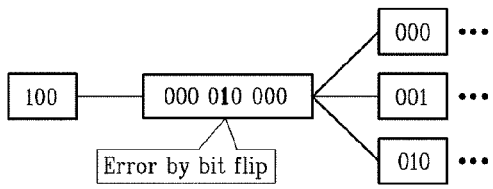
FIG. 12 is a block diagram of a data recording apparatus according to an embodiment of the present invention.

FIG. 12 is a block diagram of a data recording apparatus according to an embodiment of the present invention. The data recording apparatus according to the embodiment of the present invention will now be described with reference to FIG. 12. As shown, the recording apparatus according to the embodiment of the present invention includes a modulation unit 2100 and an optical unit 2200.

The modulation unit 2100 modulates input data to generate modulation data and the optical unit 2200 records the modulation data generated by the modulation unit 2100 on a recording medium 2300. The optical unit 2200 may include an optical pickup.

As shown in FIG. 12, the modulation unit 2100 includes a Low Density Parity Check Code (LDPC) encoder 210, an RLL encoder 211, a bit flipper 212, and a precoder 214.

The LDPC encoder 210 encodes input data using an LDPC encoding scheme for performing error correction.

The RLL encoder 211 modulates data output from the LDPC encoder 210 using an RLL code. FIG. 13 illustrates an example modulation table that can be used at the RLL encoder 211. The modulation table of FIG. 13 contains a parity complementary code having a constraint of (1, ' ', 2). That is, a channel sequence generated by the modulation table may include at least one "0" between 1s and may include an infinite number of 0s. In addition, a Repeated Minimum Transition Run (RMTR) constraint is 2. The modulation table includes at least one register and each register contains a codeword corresponding to an input code and information specifying a next register.

When the channel sequence generated by the RLL encoder 211 violates the Run Length Limit (RLL) constraint, the bit flipper 212 performs bit flip at a position prior to a position at which the RLL constraint is violated among the positions of bits included in the channel sequence to apply the RLL constraint. A detailed description of this process will be described later.

The precoder 214 converts data generated by the RLL encoder 211 and the bit flipper 212 into a Non Return to Zero Invert (NRZI) signal and transfers the NRZI signal to the optical unit 2200. The optical unit 2200 records the modulated data on the recording medium 2300 using the optical pickup.

Reference will now be made in detail to a data modulation method according to an embodiment of the present invention. First, a channel sequence corresponding to input bits is generated using the modulation table illustrated in FIG. 13. As described above, the modulation table of FIG. 13 generates a (1, ' ', 2) parity complementary code.

FIG. 13 illustrates a modulation table used when the code rate is ⅔, i.e., used to generate a 3-bit codeword for a 2-bit input code. FIG. 13 also illustrates a modulation method when the modulation table includes 5 registers, each of which is divided into 5 states. However, the present invention is not limited to this modulation method and may be applied to a method that uses a different type of modulation table.

As shown in FIG. 13, a codeword corresponding to an initial input code is output at an initial state set in the modulation table and movement is then made to a next state set in the modulation table so as to sequentially generate codewords for subsequent input codes.

For example, when it is assumed that encoding of modulation codes starts at the state S1 and an input sequence to the modulation code encoder is [10 10 10], a channel code for the initial input code [10] is [000] and the next state is S1 according to the modulation table of FIG. 13. Accordingly, a channel code for the next input code [10] is also [000]. A channel sequence generated in this procedure is [000, 000, 000].

On the other hand, to achieve appropriate timing recovery of the system, it is necessary to apply a k constraint (i.e., the constraint of the maximum number of 0s present between 1s) to the channel sequence generated in the above manner.

In this embodiment, the k-condition is applied using the bit flip method. Here, it is necessary to select a bit flip position so as not to violate other constraints of the designed modulation code in the procedure for applying the k constraint.

Bit flip is a method for applying an error to the generated channel sequence before the data is recorded on the recording medium. Accordingly, the sequence recorded on the recording medium contains errors. In the modulation method according to the embodiment of the present invention, the number of errors is equal to the number of flipped bits.

Errors created by bit flip are corrected by an error correction algorithm in a decoding unit. An increase in the number of bit flips causes an increase in the amount of additional information of the error correction algorithm, thereby reducing decoding efficiency. Thus, it is necessary to keep the number of bit flips below an appropriate upper limit.

In this case, the k constraint is determined based on the fact that the number of bit flips increases as the value of "k" decreases. The k constraint can be set based on statistical check of the number of bit flips. It is preferable that the value k be determined so that the number of bit flips (i.e., the number of applied errors) is within the correction capabilities of the error correction code. The value k may also be determined according to presence or absence of a bit flip position that prevents the occurrence of error transfer during decoding.

For example, the value k for the channel sequence can be set to 7-10. Bit flip methods in the cases where the value k is 10, 9, and 7 are described below with reference to FIGS. 14 to 22.

First, a bit flip method in the case where the value k is 10 is described below with reference to FIGS. 14 to 16. The channel sequence generated using the modulation table may violate a k constraint of "10" according to relations with a sequence prior to the channel sequence and a sequence subsequent thereto. The k constraint "10" is applied to the generated channel sequence by performing bit flip on the channel sequence.

FIGS. 14 to 16 illustrate an example wherein bit flip is performed when k is 10. When the value k is set to 10, a bit flip position is determined. Here, a bit flip position for applying the k constraint to the channel sequence can be selected so as not to cause error transfer during decoding.

To prevent error transfer during decoding, the bit flip position can be determined based on both a position at which the k constraint is violated and the length of a codeword. More specifically, the bit flip position may be determined by a remainder after the violation position is divided by the codeword length.

For example, the bit flip position is 4 bits before the violation position when the remainder of the division of the violation position by the codeword length is 0, is 2 bits before the violation position when the remainder is 1, and is 3 bits before the violation position when the remainder is 2.

In the case of FIG. 14, the violation position of the k constraint "10" is a 14th bit position. The length of a codeword based on the modulation table is 3. Here, the bit flip position is an 11th bit position that is 3 bits before the 14th bit position which is the violation position since the remainder of the division of the violation position by the codeword length is 2. Through this bit flip, the channel sequence becomes a sequence to which the k constraint "10" has been applied. In this case, the d constraint requiring that at least one "0" be present between 1s (i.e., d=1) and the r constraint (i.e., r=2) are satisfied without causing error transfer during decoding.

In the case of FIG. 15, the violation position of the k constraint "10" is a 13th bit position. Thus, the bit flip position is the 11th bit position that is 2 bits before the 13th bit position which is the violation position since the remainder of the division of the violation position by the codeword length is 1. Through this bit flip, the channel sequence becomes a sequence to which the k constraint "10" has been applied. In this case, the bit flip allows satisfaction of the d and r constraints (i.e., d=1, r=2) without causing error transfer during decoding.

In the case of FIG. 16, the violation position of the k constraint "10" is a 12th bit position. Thus, the bit flip position is the 8th bit position that is 4 bits before the 12th bit position which is the violation position since the remainder of the division of the violation position by the codeword length is 0. Through this bit flip, the channel sequence becomes a sequence to which the k constraint "10" has been applied. In this case, the bit flip allows satisfaction of the d and r constraints (i.e., d=1, r=2) without causing error transfer during decoding.

Reference will now be made to a bit flip method when the value k is 9. The channel sequence generated using the modulation table violates a k constraint of "9" according to relations with a sequence prior to the channel sequence and a sequence subsequent thereto. The bit flipper 212 applies the k constraint "9" to the generated channel sequence by performing bit flip on the channel sequence.

Figure 19:
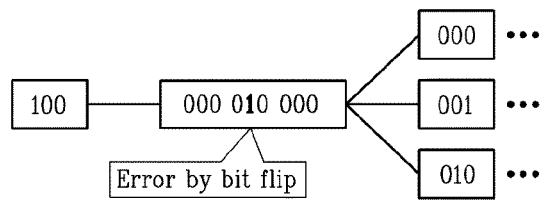

FIGS. 17 to 19 illustrate an example wherein bit flip is performed when k is 9. A method for performing bit flip is described below in detail with reference to FIGS. 17 to 19. As described above, a bit flip position for applying the k constraint to the channel sequence is selected so as not to cause error transfer during decoding.

First, a specific bit flip position which does not cause error transfer during decoding is selected to apply the constraint of k=9 to the channel sequence. To prevent error transfer during decoding, the bit flip position can be determined based on both a position at which the k constraint is violated and the length of a codeword.

In the case of FIG. 17, the violation position of the k constraint "9" is the 13th bit position. The length of a codeword according to the modulation table is 3. Here, the bit flip position is determined by a remainder after the violation position is divided by the codeword length.

For example, the bit flip position is 4 bits before the violation position when the remainder of the division of the violation position by the codeword length is 0, is 2 bits before the violation position when the remainder is 1, and is 3 bits before the violation position when the remainder is 2.

In the case of FIG. 17, the bit flip position is the 11th bit position that is 2 bits before the 13th bit position which is the violation position since the remainder is 1. Through this bit flip, the channel sequence becomes a sequence to which the k constraint "9" has been applied. In this case, the d and r constraints (i.e., d=1, r=2) are satisfied without causing error transfer during decoding.

In the case of FIG. 18, the violation position of the k constraint "9" is the 12th bit position. Thus, the bit flip position is the 8th bit position that is 4 bits before the 12th bit position which is the violation position since the remainder is 0. Through this bit flip, the channel sequence becomes a sequence to which the k constraint "9" has been applied. In this case, the bit flip allows satisfaction of the d and r constraints (i.e., d=1, r=2) without causing error transfer during decoding.

In the case of FIG. 19, the violation position of the k constraint "9" is the 11th bit position. Thus, the bit flip position is the 8th bit position that is 3 bits before the 11th bit position which is the violation position since the remainder is 2. Through this bit flip, the channel sequence becomes a sequence to which the k constraint "9" has been applied. In this case, the bit flip allows satisfaction of the d and r constraints (i.e., d=1, r=2) without causing error transfer during decoding.

Reference will now be made to a bit flip method when the value k is 7. The channel sequence generated using the modulation table violates a k constraint of "7" according to relations with a sequence prior to the channel sequence and a sequence subsequent thereto. The bit flipper 212 applies the k constraint "7" to the generated channel sequence by performing bit flip on the channel sequence.

Figure 20:
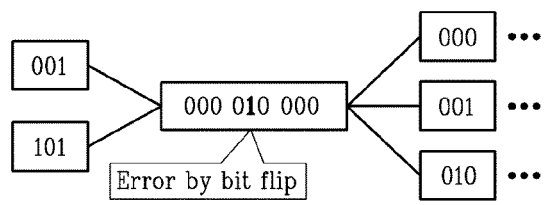
FIGS. 20 to 22 schematically illustrate a method for performing bit flip when k is 7 in the embodiment of the present invention.
Figure 21:
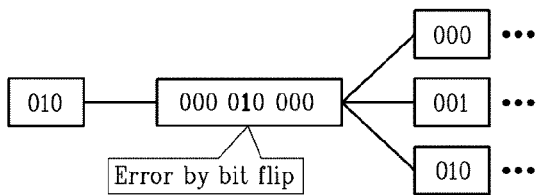
Figure 22:
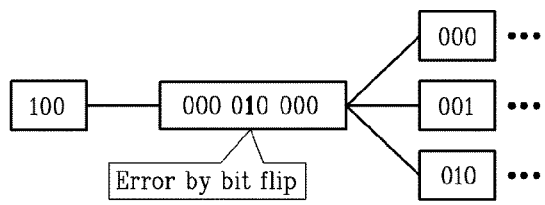

FIGS. 20 to 22 illustrate an example wherein bit flip is performed when k is 7. A method for performing bit flip is described below in detail with reference to FIGS. 20 to 22. As described above, a bit flip position for applying the k constraint to the channel sequence is selected so as not to cause error transfer during decoding.

First, a specific bit flip position which does not cause error transfer during decoding is selected to apply the constraint of k=7 to the channel sequence. To prevent error transfer during decoding, the bit flip position can be determined based on both a position at which the k constraint is violated and the length of a codeword.

In the case of FIG. 20, the violation position of the k constraint "7" is the 11th bit position. The length of a codeword according to the modulation table is 3. Here, the bit flip position is determined by a remainder after the violation position is divided by the codeword length.

For example, the bit flip position is 1 bit before the violation position when the remainder of the division of the violation position by the codeword length is 0, is 2 bits before the violation position when the remainder is 1, and is 3 bits before the violation position when the remainder is 2.

In the case of FIG. 20, the bit flip position is the 11th bit position that is 3 bits before the 11th bit position which is the violation position since the remainder is 2. Through this bit flip, the channel sequence becomes a sequence to which the k constraint "7" has been applied. In this case, the d and r constraints (i.e., d=1, r=2) are satisfied without causing error transfer during decoding.

In the case of FIG. 21, the violation position of the k constraint "7" is the 10th bit position. Thus, the bit flip position is the 8th bit position that is 2 bits before the 10th bit position which is the violation position since the remainder is 1. Through this bit flip, the channel sequence becomes a sequence to which the k constraint "7" has been applied. In this case, the bit flip allows satisfaction of the d and r constraints (i.e., d=1, r=2) without causing error transfer during decoding.

In the case of FIG. 22, the violation position of the k constraint "7" is the 9th bit position. Thus, the bit flip position is the 8th bit position that is 1 bit before the 9th bit position which is the violation position since the remainder is 0. Through this bit flip, the channel sequence becomes a sequence to which the k constraint "7" has been applied. In this case, the bit flip allows satisfaction of the d and r constraints (i.e., d=1, r=2) without causing error transfer during decoding.

In the above examples, it can be seen that the number of errors after decoding is equal to the number of bit flips even though the channel sequence has been converted by performing bit flip. Although a code generated by the modulation table includes many channel sequences violating the k constraint, each channel sequence can be converted into a channel sequence satisfying the k constraint, the d constraint, and an RMTR constraint according to the above method. In addition, the modulation method according to the embodiment of the present invention does not require an auxiliary table for applying the k constraint. Accordingly, the modulation method according to this embodiment can achieve excellent DC suppression performance.

Figure 23:
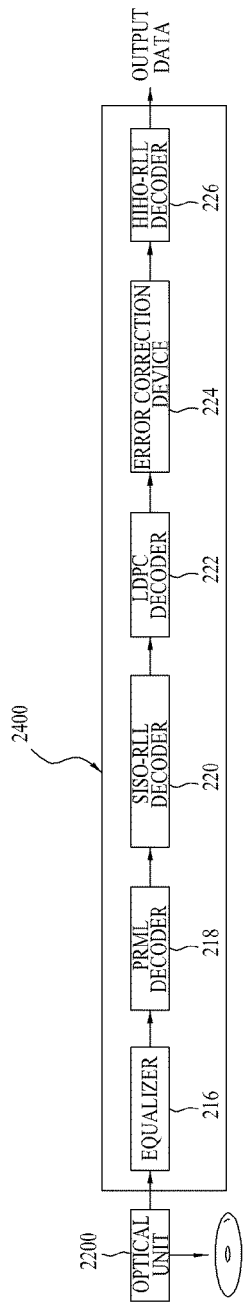
FIG. 23 is a block diagram of a data reproducing apparatus according to an embodiment of the present invention.

FIG. 23 is a block diagram of a data reproducing apparatus according to an embodiment of the present invention. As shown, the data reproducing apparatus includes an optical unit 2200 and a demodulation unit 2400. The optical unit 2200 may include an optical pickup and the demodulation unit 240 includes an equalizer 216, a Partial Response Maximum Likelihood (PRML) decoder 218, a Soft-In-Soft-Out (SISO)-RLL decoder 220, an LDPC decoder 222, an error correction apparatus 224, and a Hard-In-Hard-Out (HIHO)-RLL decoder 226.

The optical unit 2200 emits light to the recording medium 2300 and receives light reflected from the recording medium 2300 to read lengths and alignments of marks recorded on the recording medium 2300 and outputs RF signals corresponding to the lengths and alignments of the marks.

The equalizer 216 boosts an RF signal output from the optical unit 2200 and cuts off a noise frequency component included in the RF signal for equalization of a waveform of the RF signal.

The PRML decoder 218 decodes binary data using a PRML method based on the RF signal received from the equalizer 216. The PRML method is a method in which binary data is decoded by comparing an RF signal with all expected waveforms to identify an expected waveform nearest to the RF signal.

The SISO-RLL decoder 220 receives data representing a probability value of a codeword from the PRML decoder 218 and outputs a Log Likelihood Ratio (LLR) which is a value representing the probability of each bit of a data word.

The LDPC decoder 222 receives a soft value output from the SISO-RLL decoder 220 and performs repetitive soft decoding on the received soft value according to a specific encoding scheme and outputs the decoded data.

The error correction apparatus 224 detects and corrects an error due to bit flip. A detailed configuration of the error correction apparatus 224 and the error correction method performed by the error correction apparatus will be described later.

Although the error correction apparatus 224 is illustrated as being located between the LDPC decoder 222 and the HIHO-RLL decoder 226 in FIG. 23, the error correction apparatus 224 may also be disposed between the SISO-RLL decoder 220 and the LDPC decoder 222.

The HIHO-RLL decoder 226 receives a soft value output from the LDPC decoder 222 and determines a corresponding hard value.

Figure 24:
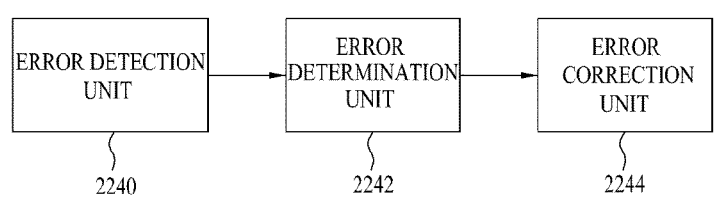
FIG. 24 is a block diagram of a data error correction apparatus according to an embodiment of the present invention.

FIG. 24 is a block diagram of the error correction apparatus 224 according to a first embodiment of the present invention. As shown in FIG. 24, the error correction apparatus 224 according to this embodiment includes an error detection unit 2240, an error determination unit 2242, and an error correction unit 2244.

The error detection unit 2240 calculates a syndrome vector (S=CHT) from a parity check matrix H and determines whether or not an error has occurred in received data (i.e., detects an error in received data). Here, T denotes transposition.

The error determination unit 2242 determines whether or not an error bit detected at the error detection unit 2240 is an error due to bit flip. Here, the error determination unit 2242 checks the frequency of detection of each error bit and determines that an error bit detected with relatively high frequency is an error due to bit flip.

To determine whether or not the error bit is an error due to bit flip, the error determination unit 2242 checks a value of the error bit using a parity check equation that does not satisfy the "0" constraint and determines whether or not an RLL constraint is present in the received data if the value of the error bit is 1.

In addition, the error determination unit 2242 can determine whether or not a Run Length Limit (RLL) constraint is present by checking the respective numbers of consecutive "0" bits prior to and subsequent to the error bit. That is, the error determination unit 2242 checks whether or not each of the respective numbers of consecutive 0 bits is equal to or greater than a preset number. If both the respective numbers of consecutive "0" bits prior to and subsequent to the error bit prior to and subsequent to a received "1" bit are equal to or greater than the preset number, the received bit is corrected by replacing the bit value "1" with "0".

Here, the respective numbers of consecutive "0" bits prior to and subsequent to the error bit can be determined based on a Repeated Minimum Transition Run (RMTR) constraint and an RLL constraint applied to the received data when the data is modulated.

The error correction unit 2244 corrects the error bit from "1" to "0" when the error bit is caused by bit flip.

FIG. 25 is a flow chart illustrating a data error correction method according to the first embodiment of the present invention. The data error correction method according to the first embodiment of the present invention will now be described in detail with reference to FIG. 25.

First, a syndrome vector S of a sequence C is checked using a parity check matrix (S100) and it is determined whether or not the syndrome vector S is 0 (S110). FIG. 26 illustrates an example parity check matrix and an example syndrome vector. If the syndrome vector is 0, this indicates that no error has occurred in the received data or that no error has been detected although an error has occurred. Accordingly, in this case, data error correction is terminated and a next process for data reproduction is performed (S120). On the other hand, if the syndrome vector S is not a zero vector, this indicates that an error has occurred in the received data.

If the syndrome vector is not a zero vector, i.e., if an error has been corrected in the received data, received bits with relatively high frequency (i.e., majority bits) are searched for in the received data including a parity check equation that does not satisfy the zero constraint (S130). The received bits with high frequency are likely to be error bits caused by bit flip. Accordingly, it is determined whether or not each of the received bits with high frequency is an error bit caused by bit flip.

Next, it is checked whether or not a bit value of each of the majority bits is 1 (S140). If the bit value of the majority bit is not "1", this cannot be determined to be an error bit caused by bit flip since bit flip performed for applying a k constraint converts "0" into "1" as described above and, therefore, data error correction is terminated and a next process is performed (S150).

If the bit value of the majority bit is "1", it is determined whether or not each of the respective numbers of consecutive 0s prior to and subsequent to the received bit "1" is equal to or greater than a preset number (S160). FIG. 27 schematically illustrates this process. In the case where bit flip for applying the k constraint has been performed as described above, more than a specific number of consecutive 0s are present prior to and subsequent to the error bit since the bit flip has been performed on a bit prior to a bit position, at which the k constraint is violated, according to a specific condition.

Accordingly, if each of the respective numbers of consecutive 0 bits prior to and subsequent to the received bit "1" is equal to or greater than the preset number, the error bit "1" can be determined to be an error bit caused by bit flip. Accordingly, the bit value of each error bit satisfying this condition is converted from "1" to "0" to correct an error (S170).

However, if the received bit does not satisfy the condition, the bit cannot be determined to be an error bit caused by bit flip and error correction is terminated and a next process is performed (S180).

Figure 28:
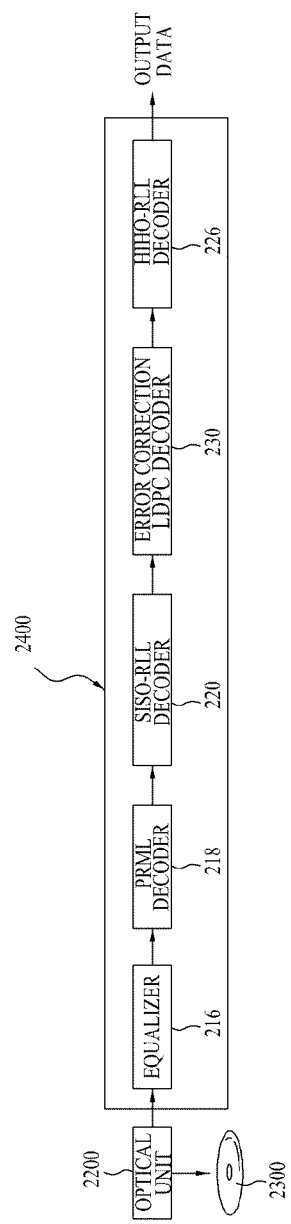
FIG. 28 is a block diagram of a data error correction apparatus according to another embodiment of the present invention.

FIG. 28 is a block diagram illustrating a data reproducing apparatus according to a second embodiment of the present invention. Here, the same elements as those of the first embodiment are denoted by the same reference numerals.

As shown in FIG. 28, the data reproducing apparatus according to this embodiment includes an optical unit 2200 and a demodulation unit 2500 and the demodulation unit 2500 includes an equalizer 216, a PRML decoder 218, an SISO-RLL decoder 220, an error correction LDPC decoder 230, and an HIHO-RLL decoder 226.

The data reproducing apparatus according to this embodiment includes an error correction LDPC decoder 230 constructed by integrating an error correction apparatus and an LDPC decoder. Since other components are similar to those of the first embodiment, a data error correction method will now be described without further description of the configuration of the data reproducing apparatus.

Figure 29:
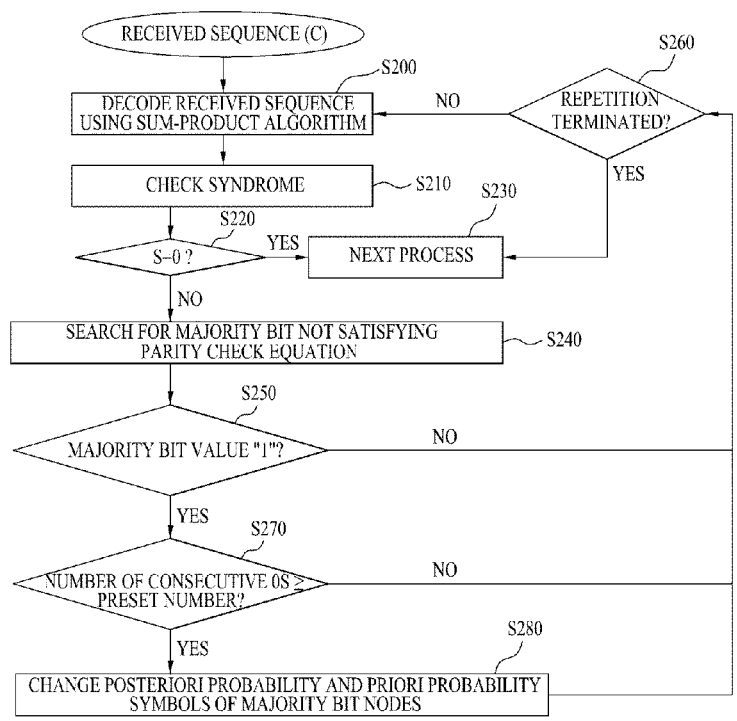
FIG. 29 is a flow chart of a data error correction method according to another embodiment of the present invention.

FIG. 29 is a flow chart illustrating a data error correction method according to the second embodiment. In the data error correction method according to this embodiment, repetitive decoding is performed a given number of times and signs of probability values associated with a bit position at which it is suspected that bit flip has occurred during the repetitive decoding procedure are converted. This method is described below in detail.

First, a received sequence C is decoded according to a sum-product algorithm (S200).

Next, a syndrome vector S of the sequence C is checked using a parity check matrix (S210) and it is determined whether or not the syndrome vector S is 0 (S220). Similar to the first embodiment, if the syndrome vector is 0, this indicates that no error has occurred in the received data or that no error has been detected although an error has occurred. Accordingly, in this case, data error correction is terminated and a next process for data reproduction is performed (S230). On the other hand, if the syndrome vector S is not a zero vector, this indicates that an error has occurred in the received data.

If the syndrome vector is not a zero vector, received bits with relatively high frequency (i.e., majority bits) are searched for in the received data including a parity check equation that does not satisfy the zero constraint (S240).

Next, it is checked whether or not a bit value of each of the majority bits is 1 (S250). If the bit value of the majority bit is not "1", this cannot be determined to be an error bit caused by bit flip since bit flip performed for applying a k constraint converts "0" into "1" as described above. Thus, if the bit value of the majority bit is not "1", it is determined whether or not repetitive decoding has been completed without performing data error correction (S260).

If the bit value of the majority bit is "1", it is determined whether or not each of the respective numbers of consecutive 0s prior to and subsequent to the received bit "1" is equal to or greater than a preset number (S270). If each of the respective numbers of consecutive 0 bits prior to and subsequent to the received bit "1" is equal to or greater than the preset number, the error bit "1" can be determined to be an error bit caused by bit flip. Accordingly, posteriori probability and priori probability signs of majority bit nodes satisfying such a condition are changed (S280).

Then, it is determined whether or not repetitive decoding has been completed (S260). Then, a next process is performed when repetitive decoding has been completed (S230) and the received sequence is decoded according to the sum-product algorithm when repetitive decoding has not been completed (S200).

In this embodiment, repetitive decoding is carried out to perform error correction and decoding as described above. The data error correction method according to this embodiment can achieve excellent decoding and error correction performance since the method is performed based on repetitive decoding and probabilities.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A data modulation method comprising:
    generating a channel sequence for an input sequence;
    determining whether or not the channel sequence violates a Run Length Limit (RLL) constraint depending upon statistical data on the number of bit flips; and
    performing, when the channel sequence violates the RLL constraint, bit flip at a position prior to a position at which the RLL constraint is violated among positions of bits included in the channel sequence.

2. The method of claim 1, wherein the performing the bit flip includes determining the bit flip position so that error transfer does not occur during decoding.

3. The method of claim 2, wherein the determining the bit flip position includes determining the bit flip position based on both the RLL constraint violation position and a codeword length.

4. The method of claim 3, wherein the determining the bit flip position includes determining the bit flip position based on a remainder of division of the violation position by the codeword length.

5. The method of claim 2, wherein the RLL constraint is a constraint regarding the maximum number of 0s present between 1s in the channel sequence and the bit flip is performed by converting a bit of "0" to a bit of "1" at a specific position.

6. The method of claim 1, further comprising setting the RLL constraint based on a statistical check of the number of bit flips.

7. The method of claim 1, wherein the generating the channel sequence for the input sequence includes generating the channel sequence for the input sequence using a modulation table.

8. The method of claim 7, wherein the modulation table includes at least one state, a codeword corresponding to an input code, and a next state.

9. The method of claim 8, wherein the modulation table generates a channel sequence in which a minimum number of 0s between 1s is 1, a maximum number of 1s between 0s is an infinite number, and a Repeated Minimum Transition Run (RMTR) constraint is 2.

10. A data modulator comprising:
an encoder configured to generate a channel sequence for an input sequence; and
a bit flipper configured to determine whether or not the channel sequence violates an RLL constraint depending upon statistical data on the number of bit flips and to perform, when the channel sequence violates the RLL constraint, bit flip at a position prior to a position at which the RLL constraint is violated among positions of bits included in the channel sequence.

11. The data modulator of claim 10, wherein the bit flipper determines the bit flip position so that error transfer does not occur during decoding.

12. The data modulator of claim 11, wherein the bit flipper determines the bit flip position based on both the position at which the RLL constraint is violated and a codeword length.

13. The data modulator of claim 12, wherein the bit flipper determines the bit flip position based on a remainder of division of the violation position by the codeword length.

14. The data modulator of claim 10, wherein the RLL constraint is a constraint regarding the maximum number of 0s present between 1s in the channel sequence and the bit flipper converts a bit of "0" to a bit of "1" at a specific position.

15. The data modulator of claim 10, wherein the encoder sets the RLL constraint based on a statistical check of the number of bit flips.

16. The data modulator of claim 10, wherein the encoder generates the channel sequence for the input sequence using a modulation table.

17. The data modulator of claim 16, wherein the modulation table includes at least one state, a codeword corresponding to an input code, and a next state.

18. The data modulator of claim 17, wherein the modulation table generates a channel sequence in which a minimum number of 0s between 1s is 1, a maximum number of 1s between 0s is an infinite number, and a Repeated Minimum Transition Run (RMTR) constraint is 2.

19. A data recording method comprising:
generating a channel sequence for an input sequence;
determining whether or not the channel sequence violates an RLL constraint depending upon statistical data on the number of bit flips;
performing, when the channel sequence violates the RLL constraint, bit flip at a position prior to a position at which the RLL constraint is violated among positions of bits included in the channel sequence to generate modulation data; and
storing the modulation data on a recording medium.

20. A data recording apparatus comprising:
a modulation unit configured to modulate data to generate modulation data; and
an optical unit configured to emit light to a recording medium to record the modulation data on the recording medium, wherein the modulation unit includes:
an encoder configured to generate a channel sequence for an input sequence; and
a bit flipper configured to determine whether or not the channel sequence violates an RLL constraint depending upon statistical data on the number of bit flips and to perform, when the channel sequence violates the RLL constraint, bit flip at a position prior to a position at which the RLL constraint is violated among positions of bits included in the channel sequence.

21. A data error correction method comprising:
detecting an error bit of received data using a parity check matrix;
determining whether or not the error bit is an error caused by bit flip; and
correcting the error bit when the error bit is an error caused by bit flip to satisfy an RLL constraint depending upon statistical data on the number of bit flips.

22. The method of claim 21, wherein the determining whether or not the error bit is an error caused by bit flip includes:
checking a value of the error bit; and
determining whether or not an RLL constraint of the received data is present if the value of the error bit is 1.

23. The method of claim 22, wherein the determining whether or not an RLL constraint of the received data is present includes checking the respective numbers of consecutive 0 bits prior to and subsequent to the error bit.

24. The method of claim 23, wherein the number of consecutive 0 bits is determined based on a Repeated Minimum Transition Run (RMTR) constraint and an RLL constraint applied to the received data.

25. The method of claim 22, wherein the determining whether or not the error bit is an error caused by bit flip further includes checking a frequency of detection of the error bit.

26. The method of claim 25, wherein an error bit detected with highest frequency is determined to be an error caused by bit flip.

27. The method of claim 21, wherein the correcting the error bit includes correcting the error bit from 1 to 0.

28. The method of claim 21, wherein the correcting the error bit includes converting a sign of a probability value of the error bit.

29. The method of claim 21, wherein the detecting the error bit of the received data includes calculating a syndrome vector from the parity check matrix and determining whether or not an error has occurred in the received data.

30. A data error correction apparatus comprising:
an error detection unit configured to detect an error bit of received data using a parity check matrix;

an error determination unit configured to determine whether or not the error bit is an error caused by bit flip; and an error correction unit configured to correct the error bit when the error bit is an error caused by bit flip to satisfy an RLL constraint depending upon statistical data on the number of bit flips.

31. The apparatus of claim 30, wherein the error determination unit checks a value of the error bit and determines whether or not an RLL constraint of the received data is present if the value of the error bit is 1.

32. The apparatus of claim 31, wherein the error determination unit checks the respective numbers of consecutive 0 bits prior to and subsequent to the error bit to determine whether or not an RLL constraint of the received data is present.

33. The apparatus of claim 32, wherein the number of consecutive 0 bits is determined based on an RMTR constraint and an RLL constraint applied to the received data.

34. The apparatus of claim 31, wherein the error determination unit checks a frequency of detection of the error bit.

35. The apparatus of claim 34, wherein the error determination unit determines that an error bit detected with highest frequency is an error caused by bit flip.

36. The apparatus of claim 30, wherein the error correction unit corrects the error bit from 1 to 0.

37. The apparatus of claim 30, wherein the error correction unit converts a sign of a probability value of the error bit.

38. The apparatus of claim 30, wherein the error detection unit calculates a syndrome vector from the parity check matrix and determines whether or not an error has occurred in the received data.

* * * * *